United States Patent
Chang

(10) Patent No.: US 9,542,869 B2
(45) Date of Patent: Jan. 10, 2017

(54) ELECTRONIC DEVICE WITH REFLECTION MEMBER

(71) Applicant: HON HAI PRECISION INDUSTRY CO., LTD., New Taipei (TW)

(72) Inventor: Shao-Han Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 163 days.

(21) Appl. No.: 14/474,837

(22) Filed: Sep. 2, 2014

(65) Prior Publication Data

US 2015/0062867 A1 Mar. 5, 2015

(30) Foreign Application Priority Data

Sep. 4, 2013 (CN) .......................... 2013 1 03947920

(51) Int. Cl.
| | |
|---|---|
| G09F 13/08 | (2006.01) |
| H04M 19/04 | (2006.01) |
| G09F 13/04 | (2006.01) |
| G09F 13/10 | (2006.01) |
| G09F 13/06 | (2006.01) |
| G09F 13/14 | (2006.01) |

(52) U.S. Cl.
CPC .............. *G09F 13/08* (2013.01); *G09F 13/04* (2013.01); *G09F 13/0409* (2013.01); *G09F 13/06* (2013.01); *G09F 13/10* (2013.01); *G09F 13/14* (2013.01); *H04M 19/048* (2013.01); *G09F 2013/0422* (2013.01); *G09F 2013/142* (2013.01)

(58) Field of Classification Search
CPC .......... G09F 13/06; G09F 13/14; G09F 13/04; G09F 13/0409; G09F 13/08; G09F 13/10; G09F 2013/142; G09F 2013/0422; H04M 19/048
USPC .......................................... 362/97.4
See application file for complete search history.

(56) References Cited

U.S. PATENT DOCUMENTS 5,842,297 A * 12/1998 Tung .................... G02B 6/0038
362/812
6,167,648 B1 * 1/2001 Dimmick .................. G09F 9/33
313/51

(Continued)

FOREIGN PATENT DOCUMENTS

| CN | 101303428 A | 11/2008 |
|---|---|---|
| CN | 101876404 A | 11/2010 |

(Continued)

*Primary Examiner* — Bryon T Gyllstrom
(74) *Attorney, Agent, or Firm* — Zhigang Ma

(57) ABSTRACT

An electronic device includes a housing, a reflection member, a glass base board, a decoration pattern, a reflection membrane, a print circuit board, and a light emitting assembly. The reflection member is fixed with the housing and defines a through hole. The glass base board is positioned on the reflection member away from the housing. The decoration pattern is positioned on the glass base board. The reflection membrane is positioned on the glass base board around edges of the decoration pattern for shielding the glass base board and reflecting light. The print circuit board is received in the housing under the glass base board. The light emitting assembly includes a base board and a light source positioned on the base board. A first light emitting portion of the glass base board is positioned between the reflection membrane and the decoration pattern.

12 Claims, 5 Drawing Sheets

(56) References Cited

U.S. PATENT DOCUMENTS

| | | | |
|---|---|---|---|
| 2004/0165402 A1* | 8/2004 | Chen | G02B 6/0021 |
| | | | 362/559 |
| 2005/0024869 A1* | 2/2005 | Chen | G09F 13/04 |
| | | | 362/235 |
| 2005/0028413 A1* | 2/2005 | Packer | G09F 13/0409 |
| | | | 40/551 |
| 2006/0021267 A1* | 2/2006 | Matsuda | G02B 6/0053 |
| | | | 40/546 |
| 2006/0077067 A1 | 4/2006 | Chong et al. | |
| 2008/0060238 A1* | 3/2008 | Chiang | G09F 13/04 |
| | | | 40/564 |
| 2010/0202128 A1* | 8/2010 | Saccomanno | F21V 3/04 |
| | | | 362/84 |
| 2010/0232165 A1* | 9/2010 | Sato | G02F 1/133611 |
| | | | 362/296.01 |
| 2013/0121023 A1* | 5/2013 | Kwon | G09F 13/14 |
| | | | 362/607 |

FOREIGN PATENT DOCUMENTS

| | | |
|---|---|---|
| CN | 102036513 A | 4/2011 |
| TW | 201119089 A1 | 6/2011 |

* cited by examiner

ELECTRONIC DEVICE WITH REFLECTION MEMBER

FIELD

The subject matter herein generally relates to an electronic device, and particularly to an electronic device with a reflection member.

BACKGROUND

Mobile phones will ring or vibrate to remind users when there is an email, a message, or a call. Some mobile phones are capable of emitting decoration light to remind users.

BRIEF DESCRIPTION OF THE DRAWINGS

Implementations of the present technology will now be described, by way of example only, with reference to the attached figures.

DETAILED DESCRIPTION

Figure 1:
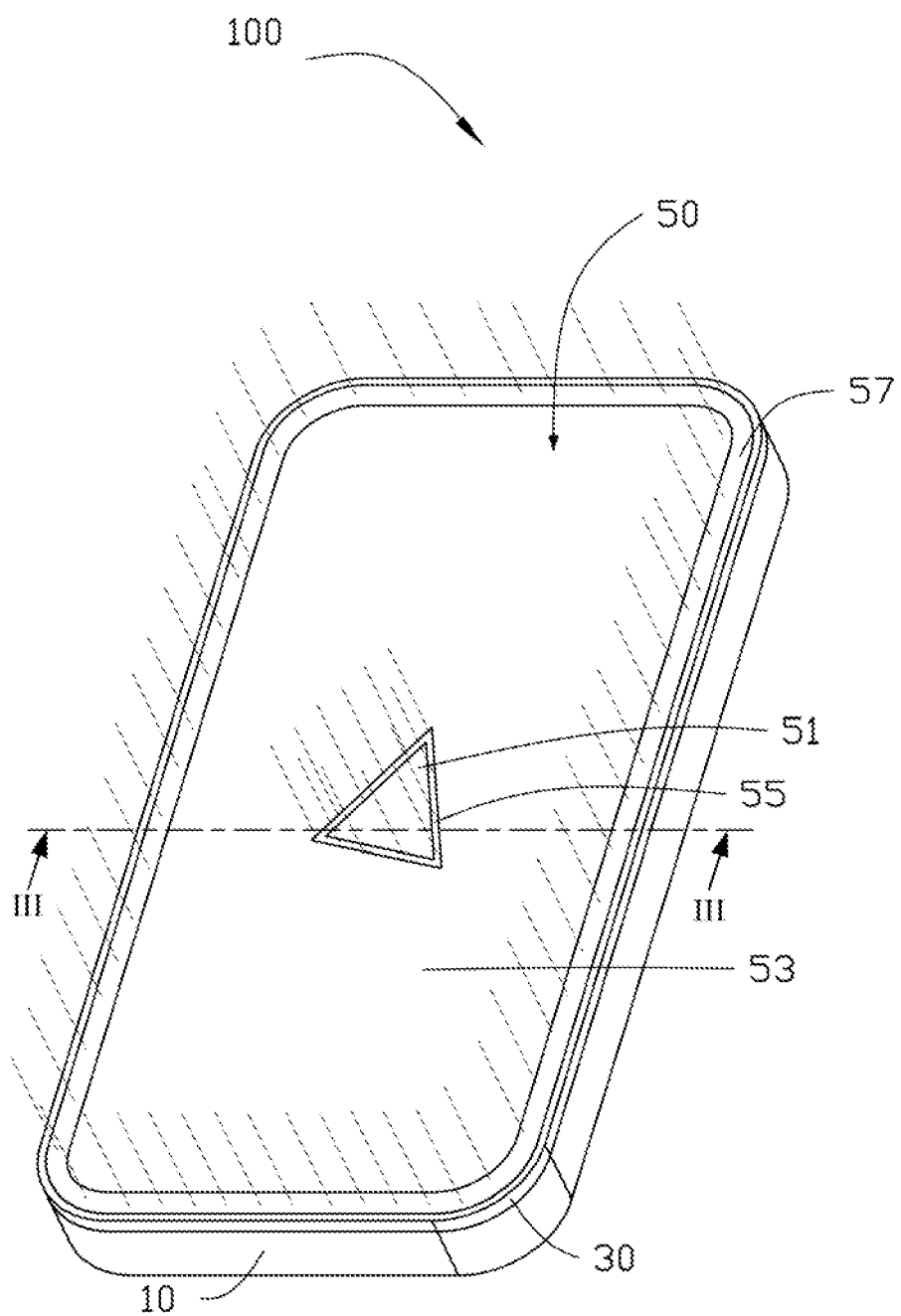
FIG. 1 illustrates an assembled, isometric view of one embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" when utilized, means "including, but not necessarily limited to"; it specifically indicates open-ended inclusion or membership in the so-described combination, group, series and the like.

An electronic device can include a housing, a circuit board, a light emitting assembly, a reflection member, a glass base board, and a reflection membrane. The housing can form a cavity. The cavity can have a floor and a wall substantially surrounding the floor. The circuit board can be positioned within the cavity and coupled to the floor of the housing. A light emitting assembly fixedly can be positioned to the circuit board for emitting light. A reflection member can have a first surface and a second surface. The second surface can be opposite to and substantially parallel to the first surface. The reflection member can be attached to the cavity wall and substantially enclosing the cavity with the first reflection member surface facing the cavity. The glass base board can be positioned on the second surface of the reflection member. The reflection membrane, with a membrane opening, can be positioned on the glass base board. A through hole can be defined within the reflection member, the light emitting assembly can be positioned in line with the reflection member through hole and the glass base board can include a decoration pattern in line with the reflection member through hole. The decoration pattern can shield the glass base board and reflect light into the cavity. The decoration pattern can be positioned on a first portion of the glass base board with the reflection membrane positioned so as to align the membrane opening and the first glass base board portion. The reflection membrane opening defines a light emitting portion of the glass base board between an edge of the reflection membrane opening and the decoration pattern. Light emitted by the light source can be reflected by the decoration pattern and the reflection member so as to be transmitted out of the electronic device through the light emitting portion.

Figure 2:
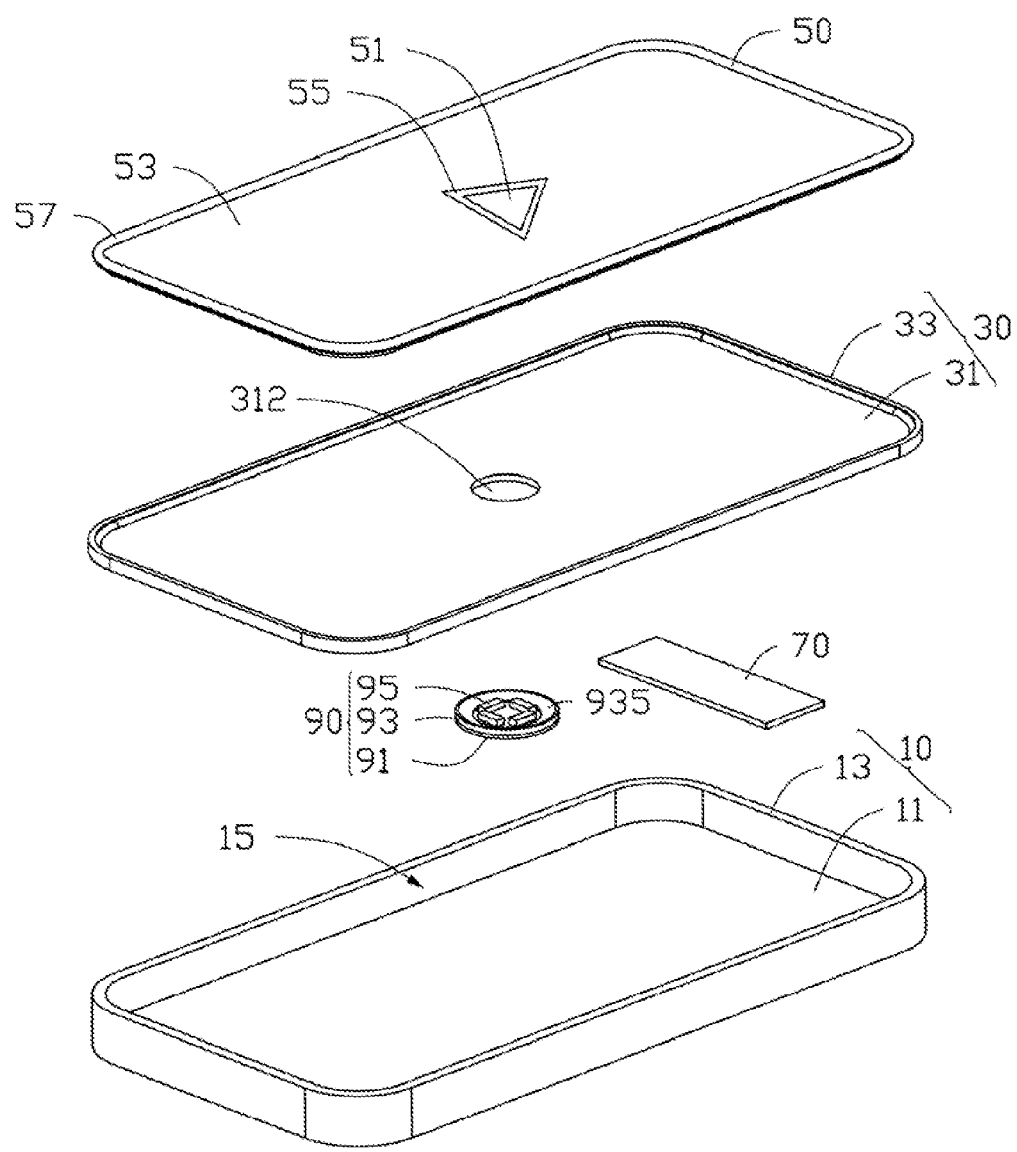
FIG. 2 illustrates an exploded, isometric view of the electronic device of FIG. 1.
Figure 3:
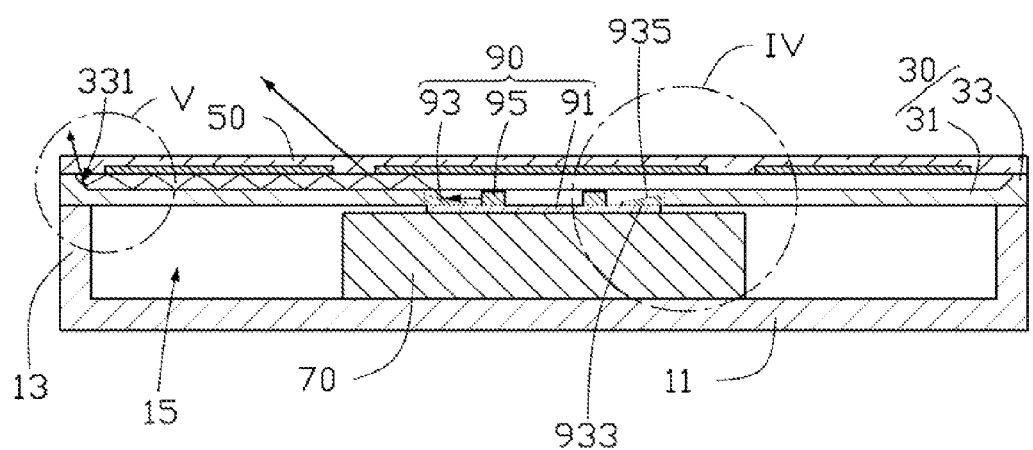
FIG. 3 illustrates a cross-sectional view of the electronic device of FIG. 1 taken along line III-III of FIG. 1.

FIG. 1 illustrates an electronic device 100. The electronic device 100 can be a mobile phone, or a tablet computer, or others. The electronic device 100 can include a housing 10, a reflection member 30, a glass base board 50, a circuit board 70, and a light emitting assembly 90. The reflection member 30 can be fixed with the housing 10. The glass base board 50 can be positioned on the reflection member 30. The reflection member 30 can be sandwiched between the housing 10 and the glass base board 50. FIG. 2 illustrates the circuit board 70 and the light emitting assembly 90. FIG. 3 illustrates the light emitting assembly 90 can be mounted on the circuit board 70 and pass through the reflection member 30. Light emitted by the light emitting assembly 90 can be reflected out of the electronic device 100 by the reflection member 30 and the glass base board 50 for reminding users, when the electronic device 100 has a call, a message or an email. The electronic device 100 can further include other functional modules, such as a display module, a CPU, and so on, but not described here for simplify.

FIG. 2 shows the housing 10 can have a cavity 15. The cavity 15 can have a floor 11 and a wall substantially surrounding the floor can include a floor 11 and a wall 13 substantially perpendicularly extending from edges of the floor 11.

Figure 4:
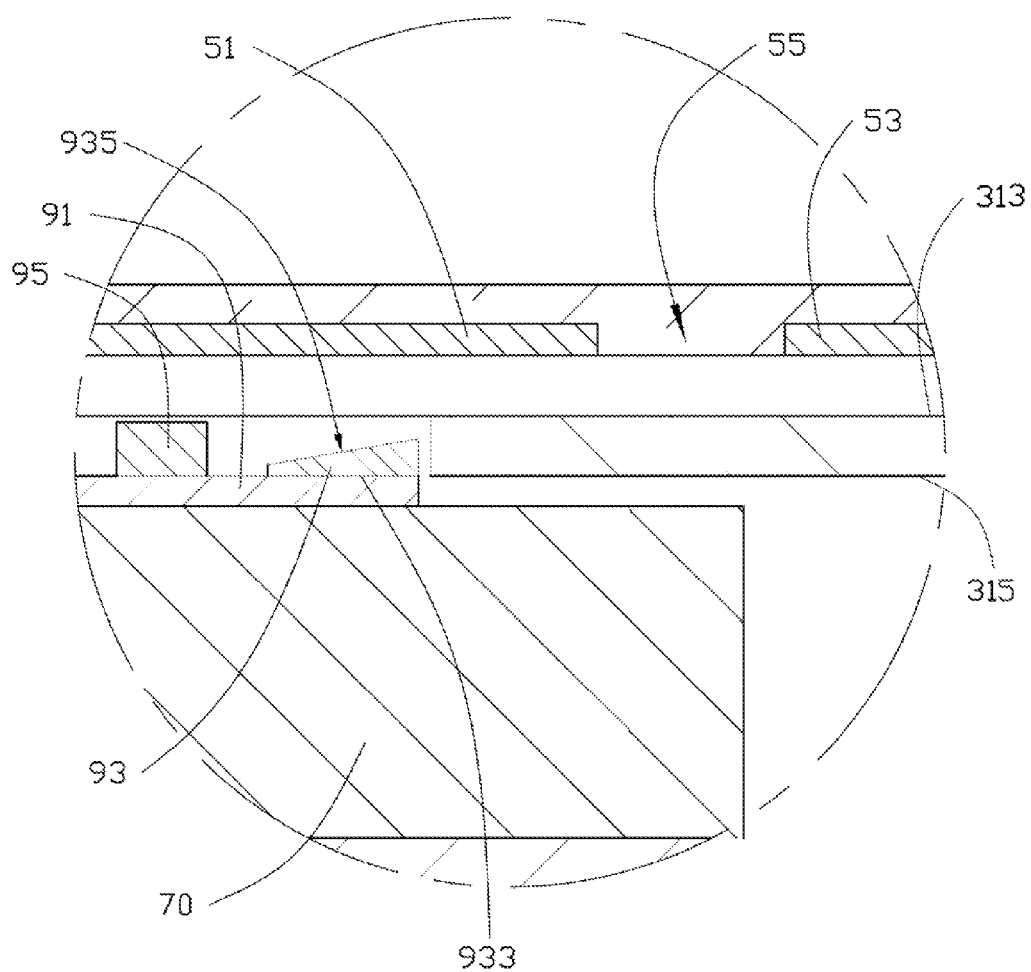
FIG. 4 illustrates an enlarged view of circled portion IV of FIG. 3.

The reflection member 30 can fit over the housing 10. FIG. 3 illustrates that the reflection member 30 can be fixedly coupled to an end of the wall 13 away from the floor 11. In other embodiments, the reflection member 30 can be fixedly coupled to the wall with a method of inserting molding, or a glue attachment, or a fixing structure. The reflection member 30 can include a main body 31 and a fixing portion 33 substantially perpendicularly extending from edges of the main body 31. The main body 31 can be positioned on a top of the wall 13 away from the floor 11. A through hole 312 (as shown in FIG. 2) can be defined through the main body 31. The main body 31 can have a first surface 313 and a second surface 315 opposite to and substantially parallel to the first surface 313 (as shown in FIG. 4). The reflection member 30 can be attached to the cavity wall and substantially enclosing the cavity 15 with the first surface 313 facing the cavity 15. A reflection surface 331 can be formed on the fixing portion 33. The reflection surface 331 can be an inner side surface and be an inclined surface. The reflection surface 331 can coupled to edges of the main body 31. In an illustrated embodiment, the reflection member 30 can be made of a plastic material with high reflectivity.

Figure 5:
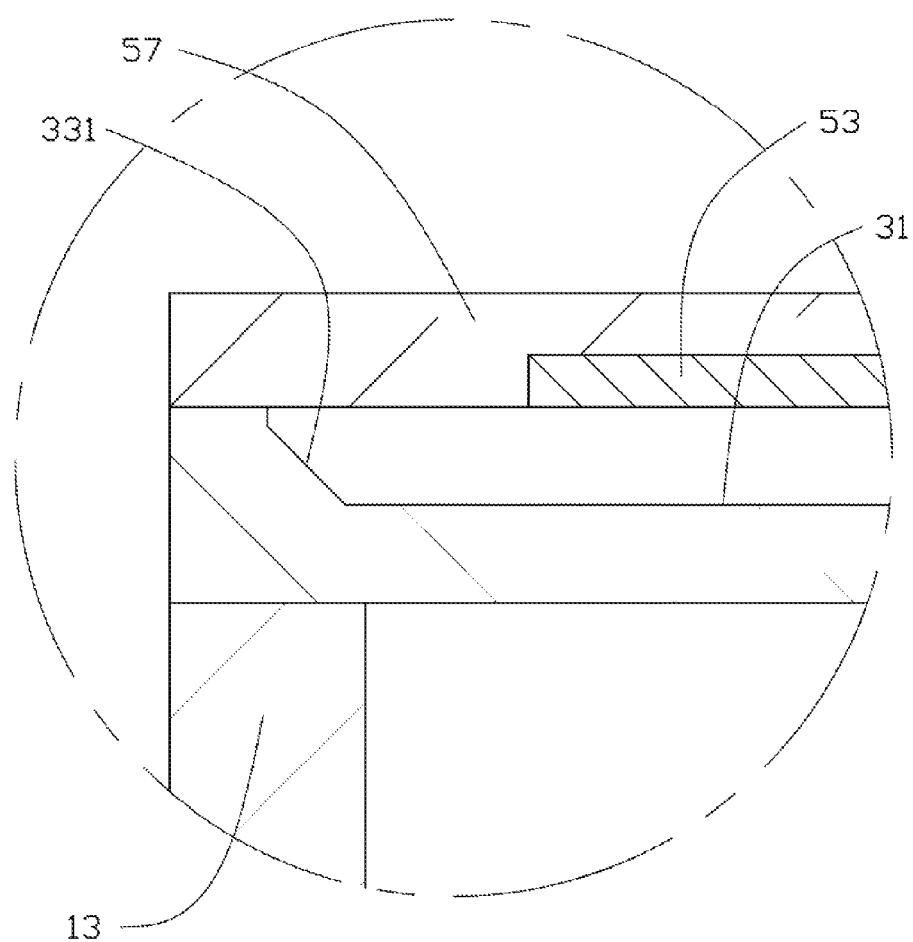
FIG. 5 illustrates an enlarged view of circled portion V of FIG. 3.

Also referring to FIGS. 4 and 5, the glass base board 50 can be fixedly mounted on a top of the fixing portion 33 away from the main body 31. The glass base board 50 can be transparent. A decoration pattern 51 can be formed on a side wall of the glass base board 50 adjacent to the reflection member 30 corresponding to the through hole 312. The decoration pattern 51 can reflect light. The decoration pattern 51 can be arranged with the through hole 312 in line. A reflection membrane 53 can be positioned on the glass base board 50 around the decoration pattern 51 for reflecting light. The reflection membrane 53 can be opposite to the reflection member 30. A first light emitting portion 55 (also shown in FIG. 1) of the glass base board 50, which is not shielded with the reflection membrane 53, can be positioned between the reflection membrane 53 and the decoration pattern 51 for letting light transmitting out of the electronic device 100. A second light emitting portion 57 (also shown in FIG. 2) of the glass base board 50, which is also not shielded with the reflection membrane 53, can be positioned on edge portions of the glass base board 50 for letting light transmitting out of the electronic device 100. The second light emitting portion 57 can be positioned adjacent to the reflection surface 331 away from the decoration pattern 51. The first light emitting portion 55 and the second light emitting portion 57 can be opposite to the main body 31. In the illustrated embodiment, the reflection membrane 55 and the decoration pattern 51 can be coated on the glass base board 50. The decoration pattern 51 can be a logo of the electronic device 100.

The circuit board 70 can be fixedly received in the cavity 15 for assembling with kinds of electronic elements, such as the light emitting assembly 90, a central processing unit.

The light emitting assembly 90 can be fixedly mounted on the circuit board 70 away from the floor 11 and received in the through hole 312. The light emitting assembly 90 can include a base board 91, a reflection element 93, and four light sources 95. The base board 91 can be substantially in circular shape. A shape of the base board 91 can fit over the through hole 312. A top surface of the base board 91 away from the circuit board 70 and a bottom surface of the main body 31 facing towards the floor 11 can be positioned in a same horizontal plane for stopping light escaping from the through hole 312 to the housing 10. The top surface of the base board 91 can be a reflecting membrane made of high reflectivity for avoiding optical loss. The reflection element 93 can protrude from the top surface of the base board 91 and be substantially in a ring shape. The reflection element 93 can include a mounting portion 933 and a reflecting portion 935 opposite to the mounting portion 933. The mounting portion 933 can be fixed on the base board 91. The reflecting portion 935 can be an arc and inclined surface.

A height of the reflection element 93 can be decreased from an outer wall of the reflection element 93 to an inner side surface of the reflection element 93. The light sources 95 can be separately positioned on the base board 91 and received in the reflection element 93 and the through hole 312. In the illustrated embodiment, the light sources 95 can be clod LED lights. The light sources 95 can emit light. Some part of the light can be transmitted out of the electronic device 100 around the decoration pattern 51 via the first light emitting portion 55 after reflections of the decoration pattern 51, the reflecting portion 935, the top surface of the base board 91, and the main body 31. Another part of the light can be transmitted out of the electronic device 100 around the reflection membrane 53 away from the decoration pattern 51 via the second light emitting portion 57 after reflections of the decoration pattern 51, the reflecting portion 935, the top surface of the base board 91, the main body 31, and the reflection surface 331. For example, a part of light emitted by the light sources 95, can be reflected by reflecting portion 935, the decoration pattern 51, and the main body 31 in sequence, then reach the first light emitting portion 55.

In use, the light sources 95 emit light when the electronic device 100 has a call, a message, or an email. The light will be emitted out of the electronic device 100 around the decoration pattern 51 and the reflection membrane 53 for reminding a user of the electronic device 100.

In other embodiments, the number of the light source 95 is not limited to four, it can be one, two, or others. The reflecting portion 935 is not limited to the arc, inclined, and ring-shaped surface, it can be positioned as other shape, such as zigzag, it just can enable light emit out of the electronic device 100 via the first light emitting portion 55 and the second light emitting portion 57.

The embodiments shown and described above are only examples. Many details are often found in the art such as the other features of a circuit board. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An electronic device comprising:
   a housing forming a cavity, the cavity having a floor and a wall substantially surrounding the floor;
   a circuit board positioned within the cavity and coupled to the floor of the housing;
   a light emitting assembly fixedly positioned to the circuit board for emitting light;
   a reflection member having a first surface and a second surface, the second surface opposite to and substantially parallel to the first surface, the reflection member attached to the cavity wall and substantially enclosing the cavity with the first reflection member surface facing the cavity;
   a glass base board positioned on the second surface of the reflection member; and
   a reflection membrane, with a membrane opening, positioned on the glass base board;
      wherein, a through hole is defined within the reflection member, the light emitting assembly is positioned in line with the reflection member through hole and the glass base board includes a decoration pattern in line with the reflection member through hole;
      wherein, the decoration pattern shields the glass base board and reflects light into the cavity and the decoration pattern is positioned on a first portion of the glass base board with the reflection membrane positioned so as to align the membrane opening and the first glass base board portion;

wherein, the reflection membrane opening defines a light emitting portion of the glass base board between an edge of the reflection membrane opening and the decoration pattern; and wherein, light emitted by the light source is reflected by the decoration pattern and the reflection member so as to be transmitted out of the electronic device through the light emitting portion.

2. The electronic device of claim 1, wherein the light emitting assembly is fixedly positioned on the print circuit board, the light emitting assembly comprising a base board, a reflection element positioned on the base board, and a light source positioned on the base board, the base board fixed on the print circuit board and arranged with the through hole in line.

3. The electronic device of claim 2, wherein the reflection element is positioned around the light source, the light source is received in the reflection element.

4. The electronic device of claim 3, wherein the reflection element comprises a mounting portion and a reflecting portion opposite to the mounting portion, the mounting portion is fixed on the base board, the reflection potion is an inclined surface.

5. The electronic device of claim 1, wherein the reflection member comprises a main body and a fixing portion extending from edges of the main body, the main body is positioned on the housing, a second light emitting portion is positioned along the edges of the glass base board around the reflection membrane, the first surface and the second surface are positioned on the main body, some of the light emitted by the sight source being reflected by the decoration pattern, the reflection membrane, and the reflection member and arriving at the light emitting portion so as to be transmitted out of the electronic device around the reflection membrane away from decoration pattern.

6. The electronic device of claim 5, wherein a reflection surface is formed on the fixing portion for reflecting the light.

7. The electronic device of claim 6, wherein the reflection surface is an inner side surface of the fixing portion and is an inclined surface.

8. The electronic device of claim 6, wherein the reflection surface is coupled to edges of the main body.

9. The electronic device of claim 5, wherein a top surface of the base board away from the circuit board and the second surface of the main body facing towards the housing are positioned in a same horizontal plane for stopping light escaping from the through hole to the housing.

10. The electronic device of claim 1, wherein a top surface of the base board is a reflecting membrane made of reflectivity material for avoiding optical loss.

11. The electronic device of claim 1, wherein the reflection membrane is coated on the glass base board.

12. The electronic device of claim 1, wherein the reflection member is made of plastic material with reflectivity.

* * * * *